Feb. 1, 1966     E. B. WHITE, JR     3,232,241
COUPLING MEANS FOR RAILWAY TRACTION VEHICLES
Filed Feb. 17, 1965     7 Sheets-Sheet 1

INVENTOR.
EUGENE B. WHITE, JR.
BY
ATTORNEYS

Feb. 1, 1966     E. B. WHITE, JR     3,232,241
COUPLING MEANS FOR RAILWAY TRACTION VEHICLES
Filed Feb. 17, 1965     7 Sheets-Sheet 3

INVENTOR.
EUGENE B. WHITE, JR.
BY
ATTORNEYS

Feb. 1, 1966  E. B. WHITE, JR  3,232,241
COUPLING MEANS FOR RAILWAY TRACTION VEHICLES
Filed Feb. 17, 1965  7 Sheets-Sheet 7

Inventor:
Eugene B. White, Jr.,
By Christ, Lockwood, Greenawalt & Dewey
Attys.

United States Patent Office 3,232,241
Patented Feb. 1, 1966

3,232,241
COUPLING MEANS FOR RAILWAY TRACTION VEHICLES
Eugene B. White, Jr., Park Forest, Ill., assignor to Whiting Corporation, a corporation of Illinois
Filed Feb. 17, 1965, Ser. No. 444,884
22 Claims. (Cl. 105—75)

This invention relates to a traction vehicle and associated coupling means for coupling the vehicle to a railway car in a manner wherein a portion of the weight of the car is transferred to the vehicle, and more particularly to a traction vehicle having coupling means of this type which is specially adapted for coupling engagement with European-type railway cars. This application is a continuation-in-part of my application filed October 1, 1963, Serial No. 313,095.

European-type railway cars include an end sill at each end of the car each of which end sills supports a centrally disposed draft hook and a pair of buffers mounted one at each end of the end sill. Each buffer includes telescoping cylindrical members extending longitudinally of the car, relative movement between the cylindrical members being controlled by suitable resilient means such as a coil spring contained within the cylindrical members. The cylindrical members forming the outer or bumping end of the bumpers are provided with pads which serve as the bumping or buffing surfaces. When two European-type railway cars are coupled together, respective buffers of the adjoining cars are brought into contact with each other and adjustable link means is engaged with the opposed draft hooks of the adjoining cars for drawing the cars together thereby compressing the buffers slightly, i.e. the buffers are compressed a distance which is only a small fraction of their full stroke of movement. The buffers remain in contact as the coupled together cars traverse a curve. As the coupled together cars traverse a curve, the adjacent buffers on the inside of the turn compress and the adjacent buffers on the outside of the turn expand and thereby remain in contact.

Light-weight traction vehicles have been provided for European-type railway cars. As is known to those skilled in the art, a traction vehicle, to be effective, must be provided with coupling means for transferring a portion of the weight of the railway car to the traction vehicle to increase the tractive effort of the latter to a degree where a number of railway cars can be moved by the traction vehicle for performing an economical operation. In an attempt to achieve this end some traction vehicles adapted for coupling engagement with European-type railway cars have been provided with vertically movable lifting pads adapted for engagement with under portions of the buffers on the end sills of these railway cars. This form of coupling construction is acceptable in some circumstances if the required tractive effort of the vehicle can be obtained by transferring only a relatively small portion of the weight of the railway car to the vehicle. The reason for this very limited weight transfer from the railway car to the vehicle is that only a relatively small lifting force, e.g. eight thousand pounds, may be applied to the under portions of the buffers. This limited lifting force that may be withstood by the buffers results from the fact that these buffers are not designed to withstand substantial vertical or upward forces, the buffers being primarily designed for withstanding loads applied in a direction longitudinally of the railway car. The traction vehicles just mentioned, in addition to being limited in the amount of tractive effort they are able to develop, have not been provided with properly mounted coupling means adapting them to negotiate curves with railway cars coupled thereto.

Other forms of traction vehicles for European-type cars have been provided with means in the nature of jacks which engage the under portion of the end sill of the railway car for transferring some of the weight of the latter to the vehicle. While this form of construction for transferring a portion of the weight of the railway car has been successful to some degree, it also has several disadvantages residing mainly in that the jack members are not properly mounted on the vehicle and thereby tend to slip on the underside of the end sill. In many instances, because of the wide variety of types of design of end sills, it has not been possible to bring these jacks into proper engagement with the underside of the end sills. A further disadvantage inherent in this type of prior art construction resides in the inability of the jacks to apply a horizontal force to the end sill for pushing the car by the traction vehicle.

Accordingly, it is a primary object of this invention to provide new and improved coupling means for coupling a traction vehicle with a European-type railway car in a manner for transferring a portion of the weight of the latter to the vehicle, which coupling means are highly versatile and permit the transfer of a higher portion of the weight of the railway car than has heretofore been possible to transfer with known devices.

It is another primary object of the present invention to provide new and improved coupling means for coupling a traction vehicle with a European-type railway car in a manner for transferring a portion of the weight of the latter to the vehicle, which coupling means is uniquely mounted on the vehicle thereby to permit the vehicle and a car coupled thereto to negotiate a curve without slipping or binding of any of the components of the coupling means.

Another object of the present invention is the provision of coupling means of the type described which include first means for connection with the body of a railway car thereby to form a rigid extension of the same, and other means for lifting said first means and for connecting the latter to the vehicle in a manner permitting the vehicle to negotiate a curve with a car coupled to the vehicle.

It is a further object of the present invention to provide coupling means of the type described which include hydraulically operated seat members adapted for engagement with the end sill of the European-type railway car and separate hydraulically actuated lifting hook members which are adapted for engagement with the buffers of a European-type car.

Another object of the present invention is the provision of coupling means of the type described which include hydraulically operated seat members which are adapted for engagement with the end sill of European-type cars in a manner whereby both a lifting force and a pushing force may be transferred to the end sill.

Still another object of the present invention is the provision of coupling means of the type described which include pad members adapted for engagement with the buffers of European-type railway cars and which coupling means includes pusher plates adapted for engagement with the pads of the buffers whereby a lifting and a pushing force may be transferred from the vehicle to the railway car.

These and other objects and advantages of the invention will become apparent from the following specification showing preferred embodiments of the invention illustrated in the accompanying drawings.

In the drawings:

FIG. 9 is an enlarged section taken along line 9—9 of FIG. 7;

Referring now to FIGS. 1, 2, 6, 7 and 11, a traction vehicle, generally designated 10, which of itself forms no part of the present invention and which is of the type disclosed in White U.S. application Serial No. 256,973, filed February 7, 1963, includes a body 10a supported from a pair of laterally spaced, longitudinally extending frame members 11 and 12. The frame members are supported on forward and rearward axles 13' and 14' (FIG. 11), respectively. Axle 13', which includes a non-slip differential, supports a pair of rail wheels 13. When the traction vehicle traverses a curve, the non-slip differential does not allow the rail wheel on the inside of the curve to slow down, as would be the case if the more conventional type of differential was employed. The non-slip differential provides the differential action by allowing the rail wheel on the outside of the curve to overrun the rail wheel on the inside of the curve. The use of non-slip differentials, among other things, reduces the power loss which results when the vehicle traverses a curve. Rear axle 14', which also includes a non-slip differential, supports rail wheels 14.

The traction vehicle includes suitable motor means, such as an internal combustion engine 15, which is connected with a torque converter 15a, preferably a fluid-type transmission of known design. Power from the torque converter is transmitted to a transmission gear box 15b by a suitable shaft. A pair of shafts extend in opposite directions from the lower portion of transmission gear box 15b and are connected with respective non-slip differentials of the forward and rearward axles. It will be understood then that internal combustion engine 15 powers all four rail wheels.

The traction vehicle includes forward and rearward pairs of road wheels 16 and 17, respectively, which road wheels are mounted on arms 16a and 17a. Forward road wheels 16 are steerable, and they are mounted on arms 16a by suitable means for being steered from within the cab of the traction vehicle. Arms 16a and 17a are swingably mounted to the frame of the traction vehicle for movement between an upper or retracted position and a lower road contacting position. Means, such as hydraulic cylinders 16b associated with suitable linkage, are provided for lowering the road wheels to the road contacting position in the manner whereby the entire traction vehicle is raised thereby lifting the rail wheels from the rails.

Separate means are not provided for driving the road wheels, the rearward or trailing pair of road wheels being driven by frictional engagement of their treads with hubs 13a on the forward pair of rail wheels when the road wheels are lowered to their ground contacting position. The differential associated with axle 13' provides a differential drive for road wheels 17 when the latter are in contact with hubs 13a secured to rail wheels 13. Preferably, hubs 13a are provided with axially extending ribs 13b, which ribs are circumferentially spaced around the driving hubs. Ribs 13b are adapted for mating engagement with corresponding ribs 17b provided on the tread portion of road wheels 17. The ribs on the driving hubs engage the ribs on road wheels 17 for substantially preventing slippage between the driving hubs and the trailing or rear road wheels, thereby greatly improving the friction drive for the road wheel assembly.

It will be understood that by the form of traction vehicle just referred to the same may be driven over the ground by the road wheels and driven onto a railway track with the rail wheels aligned over the track. Then the road wheels are lifted (or the vehicle is lowered) until the rail wheels come into contact with the rails of track. When this is accomplished the traction vehicle may be driven along the track for coupling engagement with a railway car. As noted in FIG. 1, when the road wheels are raised, or the vehicle lowered so that the rail wheels come into contact with the track, the rear road wheels are no longer in contact with the driving hubs associated with the forward pair of rail wheels.

Figure 1:
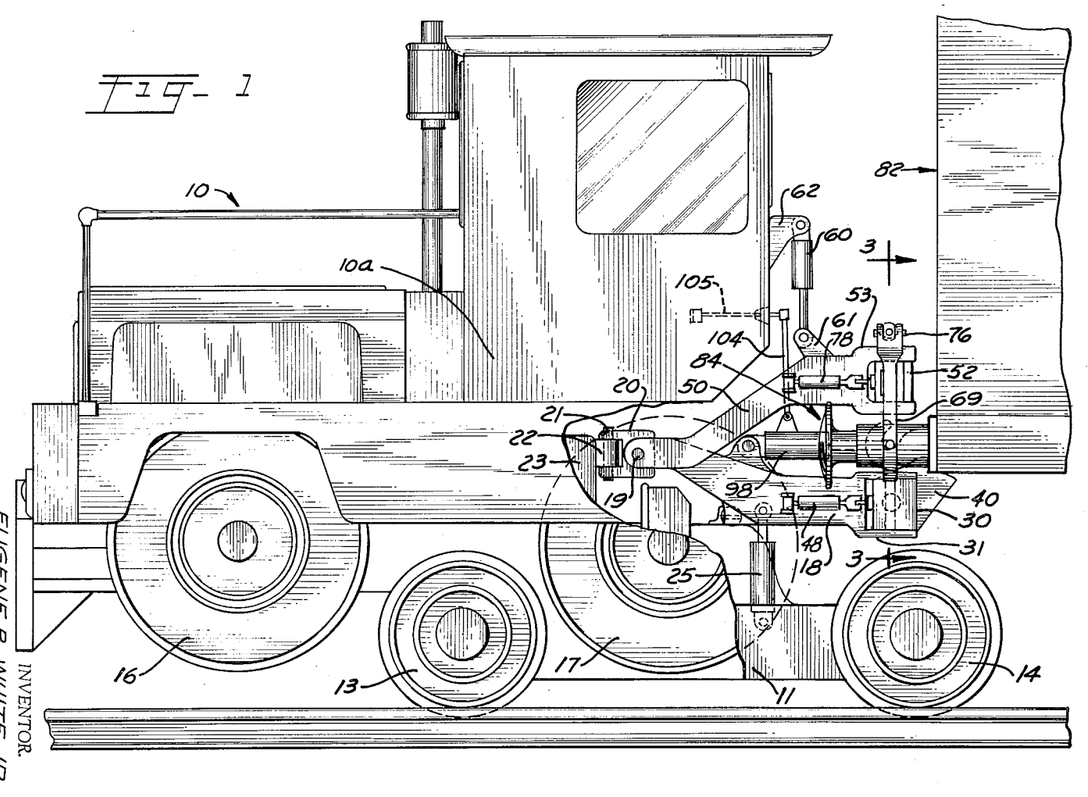
FIG. 1 is a side elevational view of a traction vehicle located adjacent one end of the European-type railway car (fragmentarily shown), with certain portions of the vehicle being broken away for illustrating one form of the coupling means of this invention.
Figure 2:
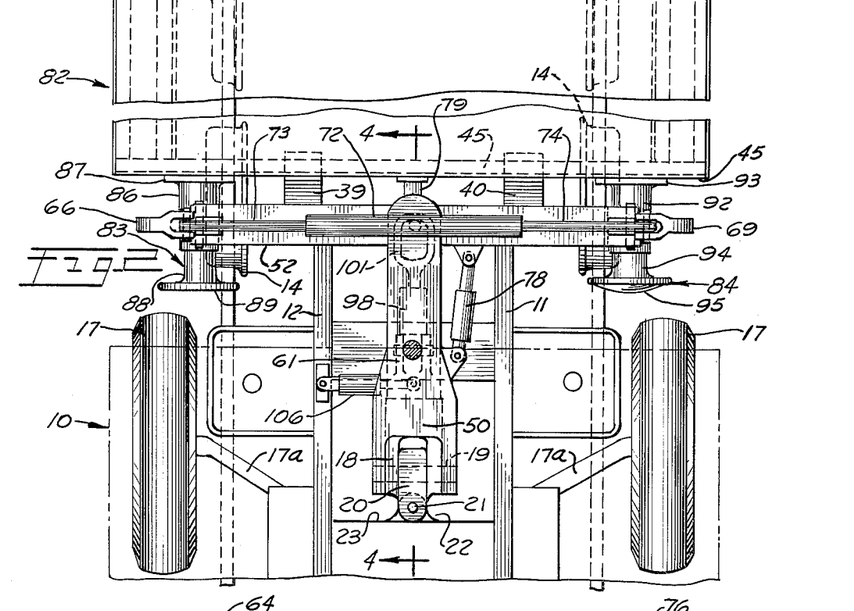
FIG. 2 is a fragmentary, top plan view of the vehicle and car of FIG. 1 with certain parts of the vehicle being broken away for better illustration of the coupling means.

Referring now to FIGS. 1 and 2, one form of the coupling apparatus of this invention includes a lower rigid arm 18 which is disposed above the rear end of the vehicle frame and which extends centrally and longitudinally thereof. The forward end of arm 18 is in the form of laterally spaced-apart ears which are apertured for receiving horizontally extending pin 19. Pin 19 is mounted in the bight portion of a link 20, the link being provided with upper and lower forwardly extending ears which receive a vertical pin 21. It will be noted that arm 18 is stepped downwardly and then extends rearwardly. Pin 21 is supported in a lug 22 which is secured to a transversely extending member 23 forming a part of the traction vehicle frame. By the construction just described it will be understood that arm 18 is adapted for swinging movement in both a horizontal and a vertical plane.

A vertical extending fluid pressure operated cylinder 25 has the upper end thereof swingably mounted to arm 18 intermediate the ends of the latter, the lower end of cylinder 25 being swingably supported by lugs 26 which are supported by a transversely extending structural member 27 (illustrated only in FIG. 4) forming a part of the traction vehicle frame. Swivel type joints are provided for connecting opposite ends of cylinder 25 to arm 18 and lugs 26 for accommodating the cylinder for swinging movement with arm 18 in both vertical and horizontal planes. It will be understood that actuation of cylinder 25 provides swinging movement of arm 18 in a vertical plane.

A horizontally and transversely extending, square in cross-section, tubular beam 30 is supported at its midpoint in a rearwardly opening U-shaped portion 31 of arm 18. The upper and lower lugs defining U-shaped portion 31 are apertured for receiving a vertically extending pin 35, which pin extends through beam 30 at the midpoint thereof. Beam 30 is adapted for swinging movement in a horizontal plane relative to arm 18 about pin 35, or in other words beam 30 is mounted at its midpoint on arm 18 for pivoting movement about a vertical axis defined by pin 35.

Figure 3:
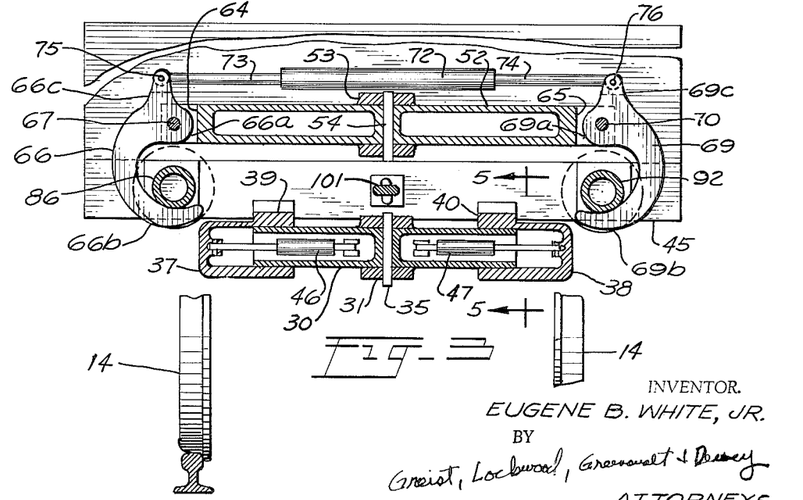
FIG. 3 is a section taken along line 3—3 of FIG. 1.

As best seen in FIG. 3, a pair of end caps 37 and 38 are telescopingly engageable with respective opposite ends of beam 30. Forming a part of cap members 37 and 38 are seat members 39 and 40, respectively. Seat member 39 includes an upwardly facing seat portion 41 (FIG. 4) and a generally vertically extending abutting portion 42 which faces rearwardly of the traction vehicle. In like manner seat member 40 includes a seat portion 43 and an abutting portion 44. Seat portions 41 and 43 are adapted for lifting engagement with the underside of an end sill 45 which forms a part of a European-type railway car. Abutting portions 42 and 44 are adapted for engagement with the vertical exposed surface of end sill 45 whereby a pushing force may be applied to the latter as will be explained hereinbelow.

Referring back to FIG. 3, a pair of fluid operated cylinders 46 and 47 are housed within beam 30 and have their inner ends suitably supported near the midpoint of the beam. These fluid cylinders have their piston rods suitably secured to the insides of the ends of respective cap members 37 and 38. It will be apparent that operation of fluid cylinders 46 and 47 causes telescoping movement of cap members 37 and 38 on the beam for adjusting the lateral spacing of seat members 39 and 40.

As seen in FIG. 1, a hydraulic piston and cylinder assembly 48 has its opposite ends pivotally secured to one side of arm 18 intermediate the ends of the latter and to beam 30 just to one side of its pivotal connection with arm 18. Actuation of hydraulic piston and cylinder assembly 48 results in pivoting movement of the beam about the mid-point thereof. The provision of assembly 48, which may be actuated from within the traction vehicle, permits beam 30 to be aligned in parallel relation with the end sill of a railway car for positioning the seat members for proper engagement with the end sill.

Figure 4:
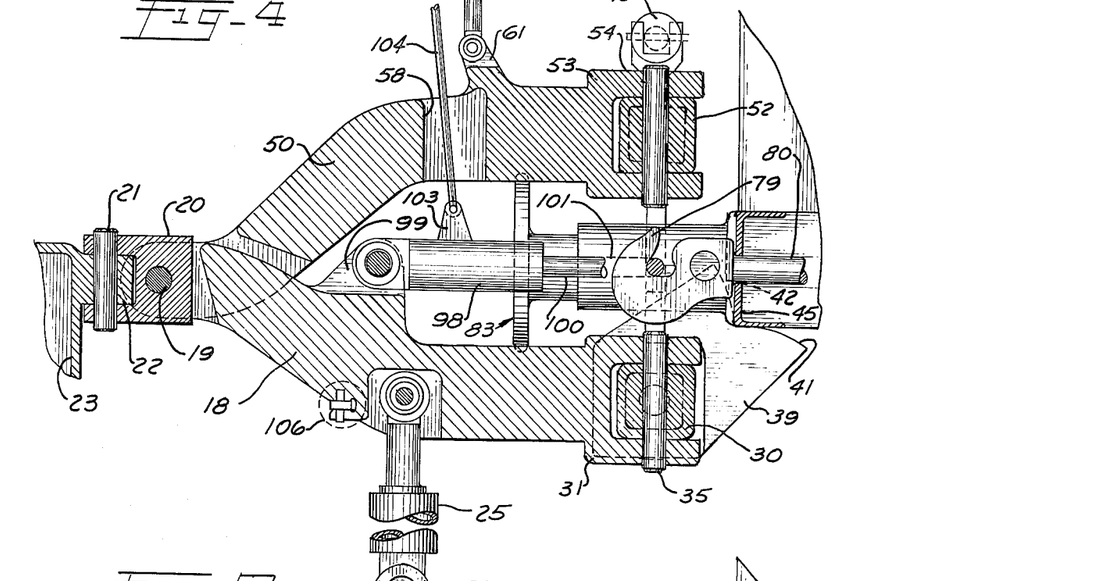
FIG. 4 is an enlarged section taken along line 4—4 of FIG. 2.
Figure 5:
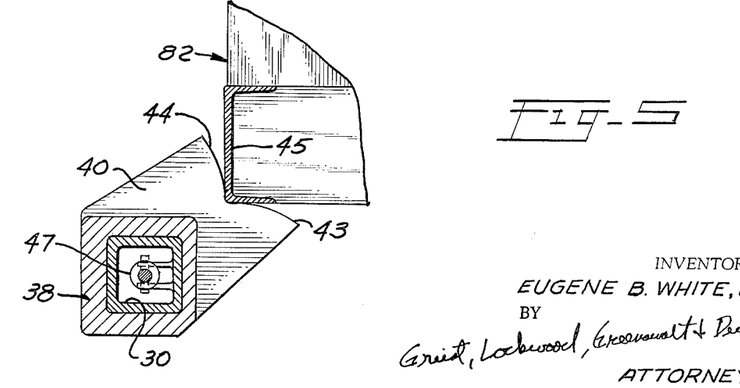
FIG. 5 is an enlarged section taken along line 5—5 of FIG. 3.
Figure 6:
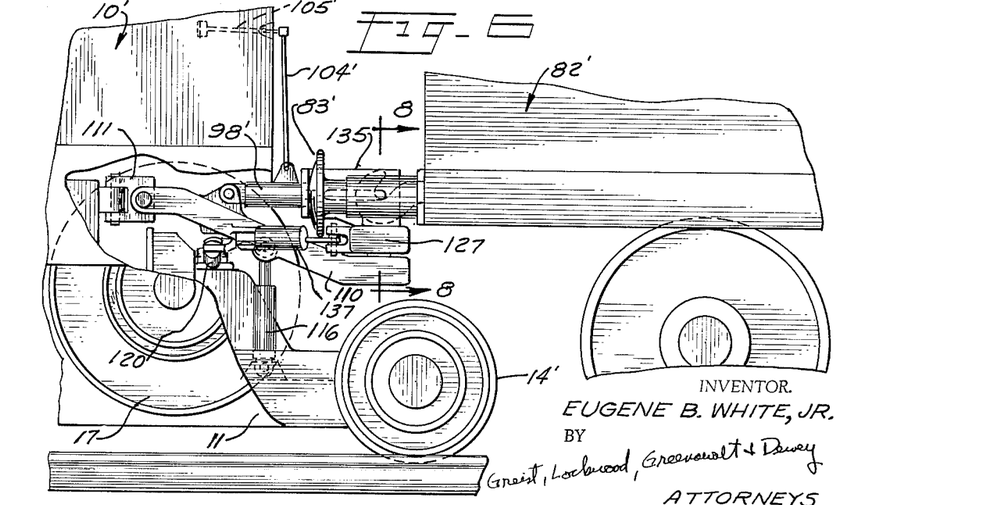
FIG. 6 is a fragmentary side elevational view of a traction vehicle located adjacent one end of a European-type railway car (fragmentarily shown), with certain parts of the traction vehicle broken away for illustrating a modified form of coupling means.

A second arm 50 overlies arm 18, and arm 50 has one end thereof in the form of a pair of spaced-apart ears for receiving therebetween the ears defining the forward end of arm 18. The spaced-apart ears defining the forward end of arm 50 are apertured for receiving pin 19, thereby adapting arm 50 for swinging movement in a vertical plane about pin 19. Arm 50 is adapted for swinging movement in a horizontal plane with arm 18 by reason of the pivotal engagement of link 20 on the traction vehicle frame. As best seen in FIGS. 1 and 4, arm 50 is stepped upwardly and then extends rearwardly.

A horizontally and transversely extending, square in cross-section, tubular beam 52, which overlies beam 30, is supported at the midpoint thereof in a rearwardly opening U-shaped portion 53 defining the rear end of arm 50. Beam 52 is adapted for swinging movement in a horizontal plane relative to U-shaped portion 53 by means of a pin 54 which extends through openings provided in the upper and lower lug portions defining the U-shaped opening. Arm 50 is provided with a generally vertically extending opening 58 intermediate the length thereof for a purpose to be referred to hereinafter. It will be understood that beam 52 is mounted on the rear end of arm 50 for pivoting movement about a vertical axis defined by pin 54.

A fluid pressure operated cylinder 60 has the lower end thereof swingably secured to spaced-apart ears 61 which are integral with arm 50 just rearwardly of opening 58. The upper end of cylinder 60 is swingably secured to mountnig lugs 62, lugs 62 being secured to body 11 of the traction vehicle. Body 11 is of course supported by the frame of the traction vehicle. Swivel type joints are provided for connecting opposite ends of cylinder 60 to arm 50 and the traction vehicle body for accommodating the cylinder for swinging movement with arm 50 in both vertical and horizontal planes. It should be apparent that actuation of cylinder 60 provides swinging movement of arm 50 in a vertical plane.

As best seen in FIGS. 2 and 3, opposite ends of beam 52 have vertically extending slots 64 and 65 formed therein. Slot 64 is adapted to receive a lug portion 66a of a depending lifting hook 66, the hook being swingably mounted to the end of beam 52 by means of a pin 67. Lifting hook 66 includes a lower inwardly extending end portion 66b and integral, upwardly extending, spaced-apart ears 66c. In like manner, slot 65 is adapted to receive a lug portion 69a of a depending lifting hook 69, lifting hook 69 being swingably mounted to this end of the beam by a pin 70. Lifting hook 69 includes a lower inwardly extending end portion 69b and integral, upwardly extending spaced-apart ears 69c.

A fluid pressure operated cylinder 72 includes oppositely extending piston rods 73 and 74 having their outer ends pivotally mounted between respective ears 66c and 69c by means of small pins 75 and 76. It will be understood that cylinder 72 is of the double acting type for providing reciprocal axial movement of piston rods 73 and 74 in unison upon actuation of the cylinder. From reference to FIG. 3, it will be apparent that actuation of cylinder 72 results in swinging movement of lifting hooks 66 and 69 in a vertical plane transverse to the traction vehicle.

As seen in FIGS. 1 and 2, a hydraulic piston and cylinder assembly 78 has one end thereof pivotally secured to one side of arm 50 intermediate the ends of the latter. The other end of hydraulic piston and cylinder assembly 78 is pivotally secured to beam 52 on one side of the pivotal connection between the beam and upper arm 50. Actuation of piston and cylinder assembly 78 provides pivoting movement of beam 52 about the vertical axis defined by pin 54. Hydraulic piston and cylinder assembly 78, which may be actuated from within the traction vehicle, permits aligning of beam 52 so that lifting hooks 66 and 69 may be positioned for engaging the buffers forming a part of European-type railway cars which will be described below.

The construction of the draft engaging member and buffers mounted on end sill 45 will now be described. It will be understood that these members are found on most European-type railway cars.

An upwardly opening draft hook 79 is mounted at the midpoint of end sill 45 as by means of a longitudinally extending rod 80 which passes through an aperture in the end sill and is secured to the underframe of a European-type railway car, generally designated 82. A pair of cushioned buffers, generally designated 83 and 44, are mounted at respective opposite ends of the end sill.

Buffer 83 includes an outer cylindrical member 86 having an outwardly extending flange 87 at one end thereof, which flange is secured to the vertical exposed face of end sill 45. An inner cylindrical member 88 is telescopingly engageable with cylinder 86, cylindrical member 88 being provided with a pad 89 having a flat face thereon. It will be understood that suitable resilient means, such as a coil spring, is housed within the cylindrical members of buffer 83 for controlling relative movement between cylindrical members 86 and 88.

Buffer 84, which is similar in construction to buffer 83, includes an outer cylindrical member 92 having an outwardly extending annular flange 93 at one end thereof, which flange is secured to the exposed vertical face of end sill 45. Buffer 84 includes an inner cylindrical member 94 telescopingly engageable with cylindrical member 92, cylindrical member 94 being provided with a pad 95 having a spherical face. It will be realized that buffer 84 includes suitable resilient means, such as a coil spring, mounted within the cylindrical members for controlling relative movement between member 92 and member 94.

It will be understood that when car 82 is to be coupled with an adjoining car having the same type coupling means, the cars are moved together until the buffers on car 82 come into contact with respective buffers on the adjoining car. The faces on the pads of the buffers of the adjoining cars are designed so that a spherical pad face is in contact with flat face 89 and a flat pad face is in contact with spherical pad face 95. This construction of contacting flat and spherical pad faces adapts the contacting buffers to remain in proper contact as they move out of axial alignment when adjoining railway cars traverse a curve. With the buffers of the adjoining cars in contact in the manner just described, suitable longitudinally adjustable link means are engaged with draft hook 79 and the opposed draft hook on the adjoining car. Tightening of this link means draws the adjoining cars together thereby compressing the buffers on each of the cars slightly. A draft force is transferred from car 82 to the adjoining car by means of the draft hooks and a pushing force is transferred by means of the buffers.

Now returning to the construction of the one form of coupling means of this invention, the same will be seen to include a fluid pressure operated cylinder 98 which is pivotally mounted at the forward end thereof to spaced-apart lugs 99 integral with lower arm 18. It will be understood that by this pivotal connection cylinder 98 is adapted for swinging movement in a vertical plane relative to arm 18. Cylinder 98 includes a piston rod 100 which has the outer end thereof in the form of a link 101 adapted to engage draft hook 79. An ear 103 is attached to cylinder 98, the ear being pivotally engageable with the lower end of a rod 104, which rod extends upwardly through opening 58 provided in upper arm 50. As seen in FIG. 1, the upper end of rod 104 is attached to a lever 105, lever 105 extending into the interior of the traction vehicle cab. It will be understood that the operator of the traction vehicle may manipulate lever 105 for manually raising and lowering cylinder 98 for disengaging and engaging, respectively, link 101 with draft hook 79.

Power means may be provided for swinging the entire coupling means laterally to aid in aligning the latter for coupling engagement with a railway car. As seen in FIGS. 2 and 4, such means may comprise a fluid pressure operated cylinder 106 swingably mounted at one end thereof by suitable means to traction vehicle frame member 12. The other end of cylinder 106 is swingably secured to the under portion of arm 18 just forwardly of its connection with cylinder 25. Actuation of cylinder 106 causes swinging movement of seat members 39 and 40 in a horizontal plane. This swinging movement of the seat members is accompanied by corresponding swinging movement of the lifting hooks by reason of the interfitting engagement of the ears defining respective forward ends of arms 18 and 50.

In use, the operation of the coupling means of this invention is as follows:

Traction vehicle 10 is manipulated adjacent the end of railway car 82 and seat members 39 and 40 are adjusted by means of cylinders 25 and 48 until seat portions 41 and 43 are brought into engagement with the underside of end sill 45 and abutting portions 42 and 44 are brought into contact with the exposed vertical face of the end sill. Prior to this operation, cylinder 78 is actuated for bringing beam 52 into parallel relation with end sill 45 and cylinder 72 is actuated for swinging hook portions 66b and 69b laterally outwardly of the traction vehicle. Cylinder 60 is then actuated for lowering the openings in lifting hooks 66 and 69 just over respective buffers 83 and 84. Cylinder 72 is again actuated for moving lifting hook portions 66b and 69b beneath the under portions of cylindrical members 86 and 92 of respective buffers 82 and 84. Now cylinder 60 is actuated for raising the hook members to a level where hook portions 66b and 69b engage the underside of respective cylindrical members 86 and 92. Cylinder 98 is lowered manually until link 101 engages hook 79. Then cylinder 98 is actuated for drawing car 82 and the traction vehicle toward each other with the exposed vertical face of end sill 45 in snug contact with abutting portions 42 and 44 of the seat members thereby in effect to clamp beam 30 and the seat members to the car.

Now cylinders 25 and 60 are simultaneously actuated for transferring a portion of the weight of the railway car 82 to the traction vehicle to increase greatly the tractive effort which may be developed by the latter. In actual practice, approximately 75% of the weight transferred is transferred by means of seat members 39 and 40. The relative values of lifting forces provided by the lifting hooks and seat members is preferably controlled by varying the sizes of cylinders 25 and 60. As mentioned above, the amount of weight that may be transferred by lifting at the under portions of the buffers is limited because these buffers are not designed to withstand substantial lifting loads. By means of the coupling means just described a substantial amount of weight may be transferred from car 82 to vehicle 10 by reason of the lifting forces applied to both the underside of end sill 45 and to the under portions of the buffers. By means of the coupling construction of this invention, more weight may be transferred from car 82 to vehicle 10 than has heretofore been possible by use of known coupling arrangements.

As is known to those skilled in the art, the end sills of European-type railway cars quite often have various parts of operating equipment secured thereto making it difficult to find clear portions on the underside of the end sill for engagement with lifting members of a traction vehicle coupling arrangement. As seat members 39 and 40 of the coupling means of this invention are adjustable transversely of the railway car, the seat members may be adjusted as desired for alignment with the most suitable portions on the underside of end sill 45. If necessary, seat members 39 and 40 may be adjusted independently for being located in the most advantageous position for engaging the underside of end sill 45. The form of seat members disclosed are adapted for ready engagement with the end sill as they only engage planar portions of the end sill immediately adjacent the lower outer transverse edge of the latter, which edge is most often unencumbered with operating equipment or other obstructions.

As beams 30 and 52 are pivotally mounted to the ends of respective arms 18 and 50 for pivoting movement about pins 35 and 54, and as arms 18 and 50 are mounted to the traction vehicle for pivoting movement in horizontal planes about pin 21, the traction vehicle and car 82 easily traverse curves when the traction vehicle and car are coupled together. The arrangement of the arms and beams permits the necessary movement between the vehicle and the arms 18 and 50. The connection of arms 18 and 50 with the vehicle by means of pin 21 acts as a compensating means and cooperates with the pivotally mounted beams to permit negotiation of a curve. In this respect, it should be pointed out that as pin 35, which defines the vertical axis of pivot of beam 30, is mounted approximately beneath the pivot point of contact between draft hook 79 and link 101, there is no tendency of beam 30 to slide transversely relative to the car when the traction vehicle and car 82 are traversing a curve. In other words, by this arrangement seat members 39 and 40 do not tend to slide along the end sill when the traction vehicle and railway car are traversing a curve.

It will be appreciated that the coupling means are highly versatile and are adapted for quick and easy coupling engagement with a railway car, all of the cylinders on the coupling means being provided with suitable operating means for being actuated from within the cab of the traction vehicle. Further, it will be appreciated that according to the construction of the coupling means just described, a pushing force as well as a lifting force may be transferred from the traction vehicle to railway car 82. The lifting force is transferred to the railway car, or stated another way a portion of the weight of the railway car is transferred to the traction vehicle, by engagement of seat portions 41 and 43 with the underside of end sill 45. A pushing force may be transferred from the traction vehicle to the railway car by engagement of abutting portions 42 and 44 with the exposed vertical face of end sill 45. Of course, a draft force is transferred to railway car 82 through draft hook 79.

It is undesirable to locate the points of contact between seat members 39 and 40 and end sill 45 and the points of contact between lifting hooks 66 and 69 and respective buffers 83 and 84 rearwardly of a vertical plane containing the axle of rear rail wheels 14 of the traction vehicle in order to prevent tipping of the traction vehicle. On the other hand, it is usually not possible to locate these various points of contact too far forwardly of the rear traction vehicle rail wheels as this results in positioning the latter beneath the end of the railway car where the traction vehicle rear wheels may come into contact with the rail wheels supporting the railway car. In some forms of European-type railway cars, the rail wheels supporting the same are positioned closely adjacent the ends of the car.

As noted in FIG. 1, the points of contact between seat members 39 and 40 are located just rearwardly of this vertical plane containing the axle of rail wheels 14. The points of contact between the lifting hooks and the buffers are located just forwardly of this vertical plane. The resultant lifting force of the separate lifting forces provided by the seat members and hook members is approximately located in the vertical plane containing rail wheels 14 in the embodiment of the invention illustrated in FIGS. 1-5. It is possible to elongate arms 18 and 50 for locating the seat members and lifting hooks somewhat rearwardly of their positions illustrated in FIG. 1 and still obtain an acceptable amount of weight transfer between car 82 and traction vehicle 10. Of course, if this is done the amount of tractive effort which may be developed by the traction vehicle is decreased by an amount which is directly proportional to the increased distance the seat members and lifting hooks are moved rearwardly of their illustrated positions.

In many instances, the amount of weight which is transferred by the seat members is sufficient for enabling the traction vehicle to develop a required tractive effort. In such instances the form of coupling means disclosed above may be modified by dispensing with upper arm 50, upper beam 52 and lifting hooks 66, 69.

In some instances, when a railway traction vehicle is being used for moving a railway car, it may only be necessary to transfer a relatively small portion of the weight of the railway car to the traction vehicle to enable the latter to develop an acceptable amount of tractive force. For example, this situation may occur in installations where only one or two railway cars are moved at any one time. In these instances, all of the desired weight of the railway car to be transferred may be transferred by merely applying a lifting force to the under portions of the buffers of the railway car. This invention includes a further modified form of coupling means for lifting engagement with the under portions of the buffers, which coupling means also include means whereby a pushing force may be transferred to the railway car.

The further modified form of coupling means is illustrated in FIGS. 6-10. The traction vehicle itself and the railway car illustrated in these FIGS. 6-10 are identical with the traction vehicle and the railway car illustrated in FIGS. 1-5, certain designated parts of the traction vehicle and railway car of FIGS. 6-10 being indicated by the primed form of numeral.

The modified form of coupling means includes an arm 110 extending centrally and longitudinally of the traction vehicle at the rear end thereof, the forward end of arm 110 being in the form of a pair of laterally spaced-apart ear portions defining a vertical slot for receiving the bight portion of a lug 111. The forward end of arm 110 is pivotally secured to the bight portion of lug 111 by a pin 112. Lug 111 includes a forwardly opening U-shaped portion, which portion includes aligned bores for receiving a vertical pin 113, the pin being supported in a block 114 forming a part of a transversely extending member which is in turn a part of the frame of the traction vehicle. It will be apparent that arm 110 is adapted for swinging movement in both a horizontal and a vertical plane.

A fluid pressure operated cylinder 116 has the upper end thereof swingably mounted on a pin 117 attached to arm 110 intermediate the length thereof. The lower end of cylinder 116 is swingably mounted to structural member 118 by a pin 119 (FIG. 9). It will be understood that structural member 118 forms a part of the frame of the traction vehicle. Swivel type joints are provided on pins 117 and 119 to accommodate the cylinder for swinging movement with arm 110 in both horizontal and vertical planes. Manifestly, actuation of cylinder 116 provides swinging movement of arm 110 in a vertical plane.

Means may be provided for swinging arm 110 in a horizontal plane such means being useful in aligning the coupling means with the equipment on the end sill of a European-type car prior to coupling engagement with the latter. This means may be in the form of a fluid pressure operated cylinder 120, which cylinder has one end thereof pivotally mounted to traction vehicle frame member 12 and the other end thereof pivotally mounted to a lug portion 121 which is integral with arm 110 at the underside thereof.

The rear end of arm 110, which arm is inclined rearwardly and downwardly, includes a vertically extending bore 122 for receiving the lower end of a pin 123. A generally horizontally and transversely extending beam 127 is provided with a vertically extending bore 128 for rotatably receiving the upper end of pin 123. Beam 127 is mounted at its midpoint on the rear end of arm 110 for pivoting movement about a vertical axis defined by pin 123.

Figure 8:
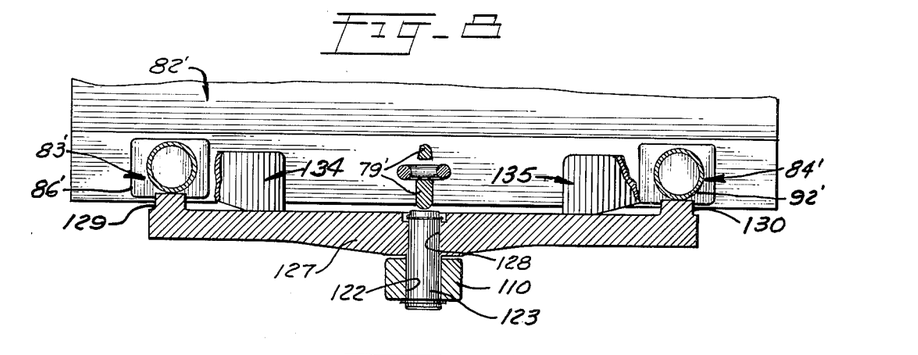
FIG. 8 is a section taken along line 8—8 of FIG. 6.
Figure 10:
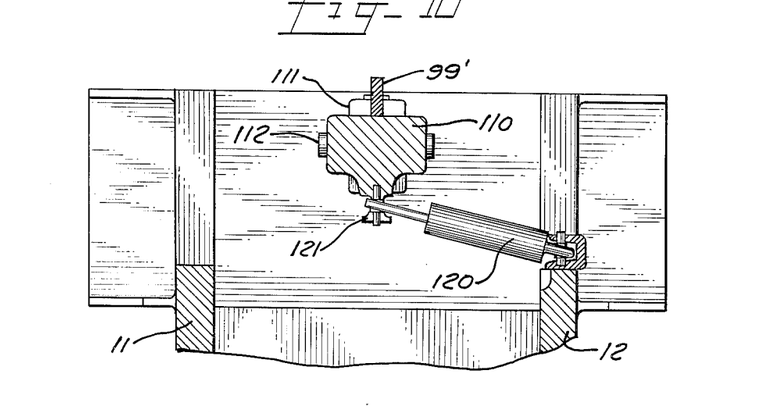
FIG. 10 is a section taken along line 10—10 of FIG. 9.

As seen in FIG. 8, a pair of pad members 129 and 130 are integrally formed at opposite ends of beam 127 on the upper surface thereof. Pad members 129 and 130 are adapted for engagement with the under portions of respective outer cylindrical members 86' and 92' of buffers 83' and 84'.

It will be understood that a portion of the weight of railway car 82' is transferred to traction vehicle 10 by actuation of cylinder 116 with the pad members 129 and 130 in engagement with the under portions of buffers 83 and 84, respectively, for lifting slightly one end of railway car 82'. Because of the pivotal connection between arm 110 and beam 127 and by reason of the pivotal connection of the arm with the traction vehicle, the traction vehicle and the railway car easily traverse curves. The connection of arm 110 to the traction vehicle by means of pin 113 serves as a compensating means and cooperates with the pivotally mounted beam to permit the necessary movement of arm 110 in a generally horizontal plane when the vehicle is traversing a curved section of track.

The modified form of coupling construction includes means for engaging draft hook 79' which are identical with the corresponding means disposed in the form of coupling construction illustrated in FIGS. 1-5. These means include a cylinder 98' pivotally mounted at the forward end thereof to a lug portion 99' integral with arm 110. Piston rod 100' of cylinder 98' includes a link portion 101' adapted for engagement with draft hook 79'.

Figure 7:
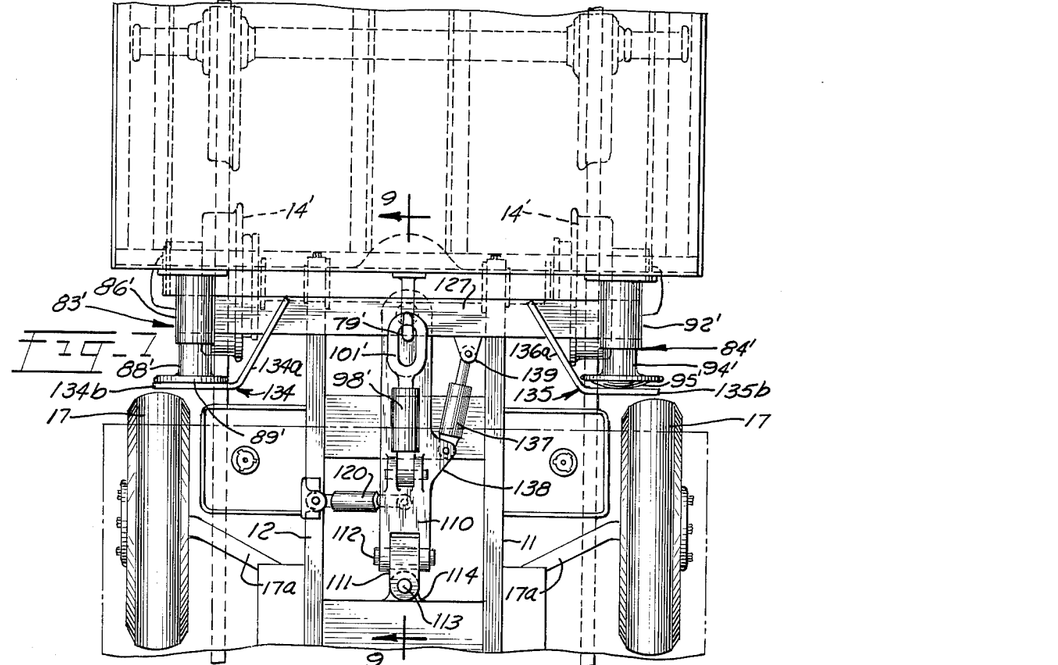
FIG. 7 is a fragmentary, top plan view of the traction vehicle and railway car illustrated in FIG. 6, with certain parts of the vehicle being broken away for better illustration of the modified coupling means.

As best seen in FIG. 7, a pair of pusher plates 134 and 135 are secured to the upper surface of beam 127. Pusher plate 134 includes an inclined portion 134a and a laterally extending portion 134b, which last mentioned portion is adapted for engagement with pad face 89' of buffer 83'. In like manner, pusher plate 135 includes an inclined portion 135a and a transversely extending portion 135b, portion 135b being adapted for abutting engagement with pad 95' of buffer 84'. Inclined plate portions 134a and 135a engage the rims of respective buffers pads 89' and 95' for aiding in laterally aligning the pusher plates with the buffers.

Powered means may be provided for swinging the beam in a horizontal plane relative to arm 110, for aiding in aligning the modified coupling means with an end of a European-type railway car. Such means include a fluid pressure operated cylinder 137 pivotally mounted at the forward end thereof to a lug portion 138 which is integral with arm 110 intermediate the length of the latter. The forward end of cylinder 137 is pivotally mounted to a lug 139 secured to the beam. It will be apparent that actuation of cylinder 137 results in movement of beam 127 about vertical pin 123.

In use, the modified form of coupling means of this invention is employed for transferring a portion of the weight of the railway car to a traction vehicle for increasing the tractive effort which may be developed by the latter by manipulating traction vehicle 10 near one end of railway car 82' until pad members 129 and 130 are disposed beneath respective buffers 83' and 84'. Ring 101 is manually lowered over draft hook 79' and cylinder 98' is actuated for drawing railway car 82' toward the traction vehicle until buffers 83' and 84' are brought into firm contact with respective portions 134b and 135b of the pusher plates. Next, cylinder 116 is actuated to a suitable degree for transferring a desired portion of the weight of car 82' to the traction vehicle. A draft force is transferred from the traction vehicle to the railway car by engagement of ring 101' with the draft hook 79'. A pushing force is transferred from the traction vehicle to the railway car by abutting engagement of the pusher plates with the buffers on railway car 82'. Therefore, by reason of this modified form of coupling means of this invention, a portion of the weight of the railway car may be transferred to the traction vehicle and the latter may transfer both draft and pushing forces to the railway car. As noted in FIG. 6, the points of contact between the pad members and buffers are located forwardly of a vertical plane containing the axle of traction vehicle rear rail wheels 14'.

Figure 11:
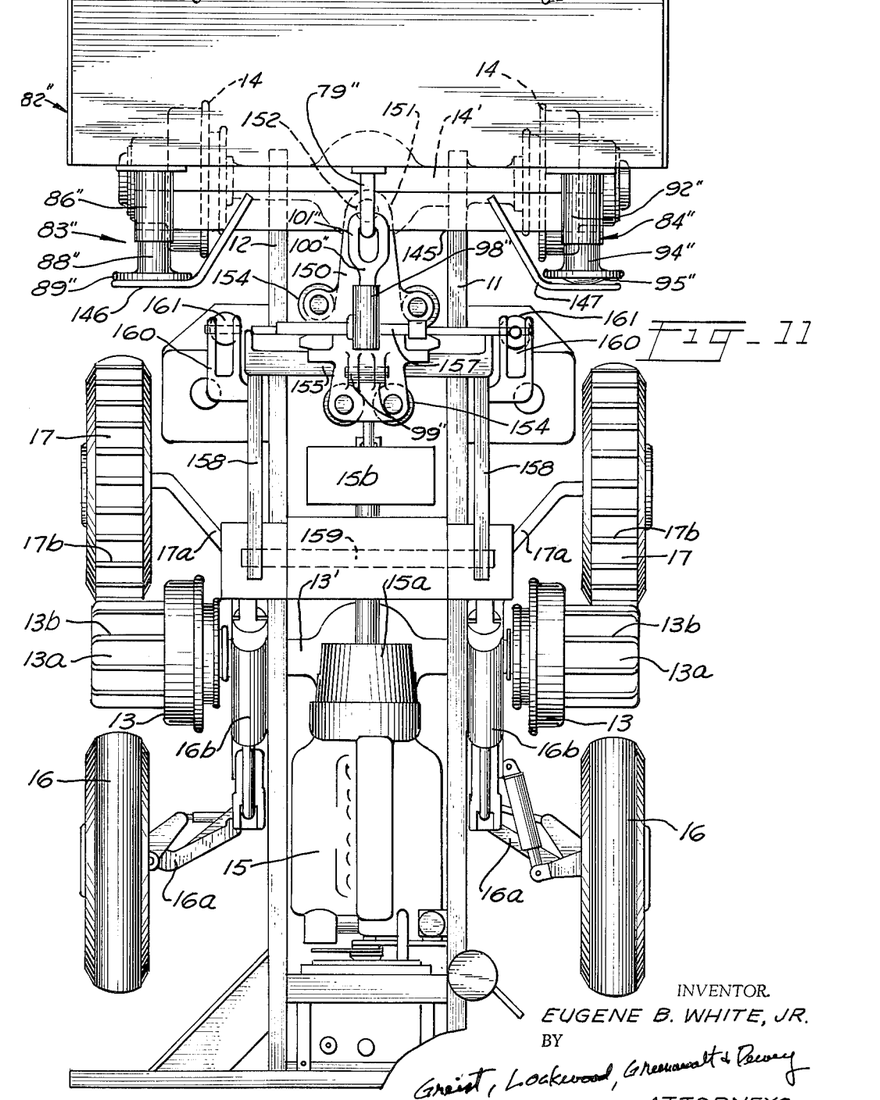
FIG. 11 is a fragmentary, top plan view of the traction vehicle and a railway car showing a further modified form of coupling means.

A further modified form of coupling means of this invention is illustrated in FIG. 11. This modified form of coupling apparatus differs primarily from the form of coupling apparatus disclosed in FIGS. 6 to 10 in that a different form of rigid member is provided for mounting the beam to the traction vehicle. In the form of coupling apparatus disclosed in FIGS. 6 to 10, a rigid arm mounts the beam to the traction vehicle, the arm being pivotally mounted at its opposite ends to the beam and traction vehicle. The arm is mounted at its forward end to the traction vehicle for pivoting movement about horizontal and vertical axes, and the arm is pivotally mounted at its rear end to the beam at the midpoint of the latter, the rear end of the arm defining a vertical axis of pivot for the beam. The vertical pivot axes at opposite ends of the rigid arm permit the car to move relative to the vehicle laterally of the direction of vehicle movement thereby allowing the traction vehicle and railway car coupled thereto to traverse curves.

In the modified form of coupling apparatus disclosed in FIG. 11, the arm is replaced by a rigid member which has a rear end supporting a vertically extending pivot which provides the pivot for mounting the beam at the midpoint of the latter. This rigid member, however, is not pivotally mounted to the traction vehicle. Rather, this rigid member is mounted to the traction vehicle for movement laterally of the direction of vehicle movement. As will be apparent to those skilled in the art, the rigid member or arm pivotally connected to the beam must be either mounted to the vehicle in the manner just described or mounted to the vehicle for pivoting movement about a vertical axis to permit the car and vehicle to negotiate curved sections of track.

This lateral movement of the rigid member on the traction vehicle in combination with the pivotal connection between the rigid member and beam permits the former to move in a generally horizontal plane when the traction vehicle traverses a curve with the car coupled thereto. In other words, in the modified form of coupling apparatus shown in FIG. 11, the connection of the rigid member to the vehicle in a manner whereby the rigid member is adapted for movement laterally of the direction of vehicle movement serves as the compensating means for providing the necessary movement of the rigid member relative to the traction vehicle to permit the latter to traverse curves in coupled relation with a car.

The traction vehicle itself and the European-type railway car illustrated in FIG. 11 are identical to the vehicle and car illustrated in FIGS. 1–10. In FIG. 11, the railway car and component parts thereof are indicated by the double primed form of numeral.

Referring now to FIG. 11, the further modified form of coupling apparatus will be seen to include a beam 145 supporting a pair of upwardly extending pads (not shown) at its opposite ends. It will be understood that the pads at the opposite ends of beam 145 are adapted for engagement with the under portions of outer cylindrical members 86" and 92" of buffers 83" and 84". Beam 145 supports a pair of pusher plates 146 and 147, which pusher plates are similar in construction to pusher plates 134 and 135 of the modified form of coupling apparatus disclosed in FIGS. 6–10.

A rigid member 150, which is mounted on the traction in a manner to be described hereinbelow, has a rear end 151 which is provided with a vertically extending bore mounting a pin 152 which extends upwardly from the upper surface of rear end 151 of the rigid member. Beam 145 is provided with a vertically extending bore at its midpoint for rotatably receiving pin 152. In other words, the beam is pivotally mounted at its midpoint on the rigid member for pivoting movement about a vertical axis defined by pin 152.

Rigid member 150, which may be in the form of a casting, mounts a plurality of rollers 154 adapted for rolling engagement along the surface of a cross-beam 155. Rollers 154 adapt rigid member 150 for reciprocal movement along the length of cross-beam 155, or for movement laterally of the direction of movement of the traction vehicle. A hydraulic piston cylinder assembly 157 connected to rigid member 150 and cross-beam 155 is provided for positioning the rigid member along cross-beam 155.

Cross-beam 155 is atached near its ends to the rear ends of a pair of arms 158. Arms 158 are pivoted at their forward ends on a cross-pin 159, which pin is supported by the frame of the traction vehicle by suitable means. It will be understood that swinging movement of arms 158 about the horizontal and transverse axis defined by pin 159 permits vertical movement of the beam. Of course, this movement of cross-beam 155 is in an arcuate path, but as the beam need only move a slight distance for all practical purposes for this movement may be considered as vertical movement only.

A pair of trunnions 160 are secured to respective opposite ends of cross-beam 155. Trunnions 160 are pivotally secured to the upper ends of a pair of vertically disposed hydraulic cylinders 161. It will be understood that the lower ends of cylinder 161 are pivotally supported from the frame of the traction vehicle. Actuation of these hydraulic cylinders provide limited vertical movement of cross-beam 155.

It should be understood that rigid member 150 is not pivotally or swingably mounted on cross-beam 155 for movement in a vertical plane. The only movement of the rigid member relative to the beam is along the length of the latter by means of rollers 154. Accordingly, when cross-beam 155 is lifted by means of hydraulic cylinders 161, the rigid member 151 is lifted for raising of beam 145 and the buffer engaging pads supported thereon.

The further modified form of coupling apparatus shown in FIG. 11 includes a draft link assembly which is similar to the draft link shown in the coupling means illustrated in FIGS. 6–10. This draft link assembly includes a hydraulic cylinder 98″ pivotally mounted at the forward end thereof to lugs 99″ integral with rigid member 150. Piston rod 100″ of the cylinder includes a link portion 101″ adapted for engagement with draft hook 79″.

The coupling apparatus disclosed in FIG. 11 may include a hydraulic piston and cylinder arrangement (not shown) between the rigid member and beam 145 to provide movement of the latter about the axis of pivot defined by pin 152.

The operation of the modified form of coupling apparatus disclosed in FIG. 11 is as follows:

The traction vehicle is positioned near one end of railway car 82″ and the various hydraulic cylinders are actuated for aligning the lifting pads at opposite ends of beam 145 beneath the outer cylindrical portions of buffers 83″ and 84″. Hydraulic cylinders 161 are then actuated for lifting the rigid member which brings about corresponding lifting of the beam for bringing the pads supported thereon into contact with the buffers thereby transferring a portion of the weight of the railway car to the vehicle. The traction vehicle is of course manipulated with respect to the car so that pusher plates 146 and 147 are in engagement with pads 89″ and 95″ of the buffers on the railway car. Draft link 101″ is engaged with draft hook 79″ for holding the buffers in engagement with the pusher plates and for permitting the traction vehicle to transfer a draft force to the railway car. A pushing force is transferred to the railway car by means of the pusher plates supported on the beam.

By the use of the form of coupling apparatus disclosed in FIG. 11, when the traction vehicle and railway car coupled thereto traverse a curve the beam pivots about the vertical axis defined by pin 152 and the rigid member shifts laterally of the direction of vehicle movement in one direction or the other depending on the direction of turning movement of the vehicle. This movement of the rigid member relative to the traction vehicle in a direction laterally of the direction of vehicle movement serves as a compensating means cooperating with the pivot defined by pin 152 for permitting the adjacent end of the railway car to move relative to the traction vehicle laterally of the direction of vehicle movement for permitting the traction vehicle and railway car coupled thereto to traverse curves. It will be understood that the rigid member is adapted to move freely along the length of cross-beam 155 during turning movement of the traction vehicle, i.e. hydraulic piston and cylinder assembly 157 does not prevent free movement of the rigid member relative to the cross-beam.

Figure 12:
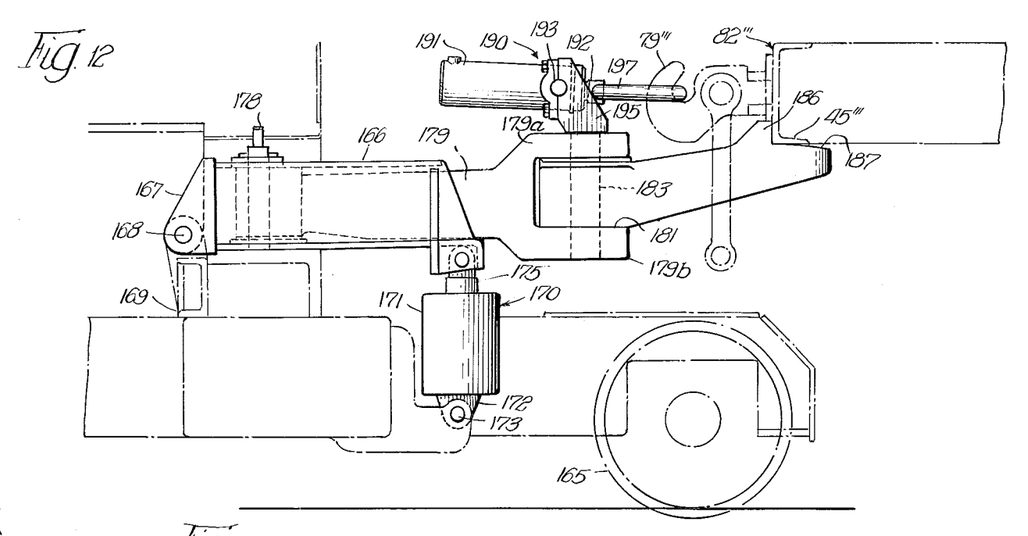
FIG. 12 is a side elevation of a modified form of coupling means of this invention shown mounted on a different traction vehicle.
Figure 13:
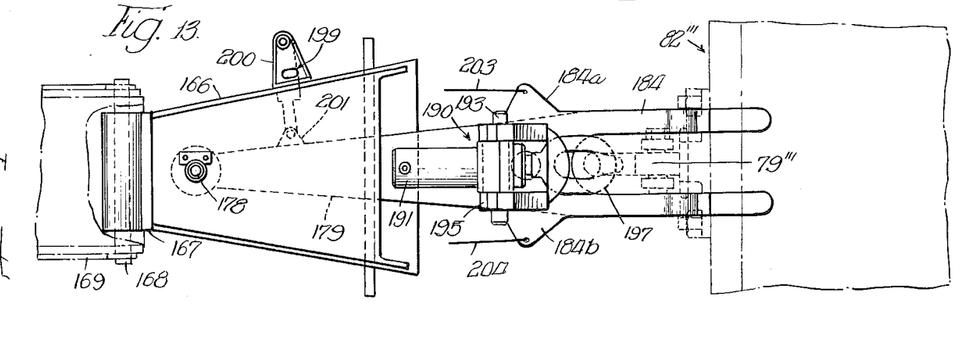
FIG. 13 is a top plan view of the modified coupler shown in FIG. 12.

Now referring to FIGS. 12 and 13, another form of coupling means of this invention is mounted on a traction vehicle of the type disclosed in Bock et al. Patent 2,718,197, assigned to the assignee of the present invention. The Bock et al. traction vehicle includes forward and rearward pairs of rail wheels (one of the rear rail wheels is illustrated in FIG. 12 and designated 165) and forward and rearward pairs of road wheels which are arranged at right angles with the rail wheels. The road wheels are movably mounted for being raised when the rail wheels are in use, and hydraulic means are provided for lifting and lowering the road wheels. Of course, it will be understood that the coupling construction of FIGS. 12 and 13 may be mounted on the traction vehicle shown in associated with the other forms of coupling construction disclosed above, as well as other suitable traction vehicles.

The coupling mechanism of FIGS. 12 and 13 includes a housing 166 having a member 167 at the forward end thereof, which member includes a bore receiving a horizontally disposed shaft 168 thereby mounting the housing for swinging movement about a horizontal axis defined by the shaft. Shaft 168 is suitably supported at its ends from a bracket 169, which bracket is mounted on the framework of the traction vehicle. Housing 166 is open at the rear end thereof and includes side walls which diverge as they extend rearwardly of the vehicle. A jack, preferably in the form of a hydraulic piston and cylinder assembly 170, is provided for raising and lowering the housing. The piston and cylinder assembly includes a cylinder 171 having a lug 172 at the lower end thereof, which lug is pivoted about a pin 173. Pin 173 extends horizontally and transversely of the vehicle and is suitably supported from the framework thereof. Piston and cylinder assembly 170 also includes a piston rod 175 pivotally secured at the upper end thereof by suitable means to the underside of housing 166.

Housing 166 supports a vertically extending pin 178. An arm 179 extends into housing 166 and has the forward end thereof provided with a vertically extending bore which receives pin 178 thereby to mount arm 179 in the housing for horizontal swinging movement relative to the latter. The underside of arm 179 rests on the bottom of the housing and slides along the same during swinging movement of the arm about pin 178. Arm 179 includes integral, upper and lower rearwardly extending portions 179a and 179b defining an opening 181. Arm portions 179a and 179b include vertically extending, aligned openings which receive opposite ends of a pin 183. A generally U-shaped member 184 has the bight portion thereof received within opening 181; the bight portion of member 184 is provided with a vertically extending opening in which pin 183 is received. Preferably, arm 184 is keyed to pin 183 and the ends of the latter are mounted in suitable bearings (not shown) mounted within arm portions 179a and 179b. It will be apparent that member 184 is carried by arm 179 for pivoting movement relative to the latter about a vertical axis defined by the axis of pin 183.

Each distal end of member 184 is shaped to provide a vertically and rearwardly facing surface 186 and a horizontally and upwardly facing surface 187. These surfaces adapt the U-shaped member 184 for lifting and pushing engagement with the end of railway car 82‴. In FIGS. 12 and 13, these surfaces are shown engaging the end sill 45‴ of the railway car. The particular form of U-shaped member 184 shown is also capable for lifting and pushing engagement with a railway car of the type having a coupler housing wihch is integral with the structural framework or underframe of the car. When coupling with a railway car of this type, surfaces 186 engage the outer or end surface of the coupler housing and surfaces 187 engage the undersurface of the coupler housing.

The coupling mechanism of FIGS. 12 and 13 includes a draft assembly in the form of a hydraulic piston and cylinder assembly 190 for holding the U-shaped member 184 in engagement with the car and for transferring a draft force from the traction vehicle to the railway car. Hydraulic piston and cylinder assembly 190 comprises a cylinder 191 and an associated piston rod 192. Cylinder 191 includes a pair of oppositely extending trunnions 193 which are journaled in a bracket 195. Bracket 195 is preferably secured to the upper end of pin 183 for rotation, in unison with member 184, about the vertical axis defined by the axis of pin 183. It will be understood from the foregoing that hydraulic piston and cylinder assembly 190 is mounted for pivoting movement both about the horizontal axis defined by trunnions 193 and the vertical axis defined by pin 183. A link 197 is secured to the outer end of piston rod 192; this link is adapted to engage draft connecting member or hook 79‴ which forms part of railway car 82‴.

Preferably, a hydraulic piston and cylinder assembly 199 (FIG. 13) is provided for swinging arm 179 relative to housing 166. The cylinder of the assembly is pivotally secured to a bracket 200, which bracket is secured to one of the side walls of housing 166. The cylinder of assembly 199 extends through an opening (not shown) in the side wall of housing 166. The piston rod associated with piston and cylinder assembly 199 is pivotally secured to a bracket 201 secured to the side of arm 179.

It will be understood that hydraulic piston and cylinder assemblies 170, 190 and 199 are all associated with suitable hydraulic control means for being operated by the operator of the traction vehicle. Preferably, means controllable by the operator of the traction vehicle are provided for swinging member 184 relative to arm 179. Such means may include cables 203 and 204 which are operated from levers (not shown) mounted at an appropriate location on the traction vehicle. Cables 203 and 204 are connected to respective ears 184a and 184b. It should be apparent that alternate pulling movement of cables 203, 204 will bring about swinging of member 184 relative to arm 179. Swinging movement of member 184 brings about corresponding swinging movement of piston and cylinder assembly 190 since the latter is fixed to the upper end of pin 183, which pin is keyed to member 184.

Desirably, cable control means (not illustrated) operable by the operator of the traction vehicle are provided for pivoting piston and cylinder assembly 190 about the horizontal axis defined by trunnions 193. In other words, in the preferred embodiment of the coupling apparatus illustrated in FIGS. 12 and 13, all movable components of the mechanism may be controlled by the operator of the traction vehicle from the same location on the vehicle.

The operation of the coupling apparatus of FIGS. 12 and 13 is as follows:

The operator of the traction vehicle drives the same toward the end of the railway car to be coupled with the vehicle. As U-shaped member 184 is brought into close proximity with the end of the car, the operator manipulates member 184 by the hydraulic and cable control means referred to above so that surfaces 186 and 187 at the distal ends of the U-shaped member contact the end of the car for lifting and pushing engagement as illustrated in FIG. 12. Prior to making contact with the end of the railway car, hydraulic piston and cylinder assembly 190 is tilted (in a counterclockwise direction as viewed in FIG. 12) so that link 197 is disposed over draft member 79''' when the ends of the U-shaped member are properly positioned at the end of the car. Hydraulic piston and cylinder assembly 190 is then rotated (by suitable control means which may be in the form of cables as mentioned above) until link 197 drops within the opening formed by the hook 79'''. Piston and cylinder assembly 190 is then actuated for withdrawing piston rod 192 thereby to draw the end of the car and U-shaped member 184 into secure engagement with each other. Finally, hydraulic piston and cylinder assembly 170 is actuated for lifting U-shaped member 184 thereby to transfer a portion of the weight of the car to the traction vehicle.

Still referring to the embodiment of the invention shown in FIGS. 12 and 13, a pushing force is transferred from the traction vehicle to the railway car by the engagement of surfaces 186 with the end of the car. A draft or pulling force is transferred from the vehicle to the car by means of the draft link 187 which engages the draft connecting member or hook 79''' of the railway car. As the traction vehicle and car traverse a curve, member 184 and piston and cylinder assembly 190 (which pivot together in unison as explained above) rotate relative to arm 179 about the vertical pivot axis defined by pin 183. During this traversing of a curve, arm 179 is allowed to move relative to the vehicle in a generally horizontal plane by the pivoting movement of arm 179 about the axis defined by pin 178. It will be appreciated that during traversing of a curve, neither member 184 nor piston and cylinder assembly 190 move relative to the railway car; in effect, these members act as a rigid extension of the car for connecting the same with the rear end of arm 179.

It will be apparent to those skilled in the art that it is desirable to have the vertical axis defined by pins 178 and 183 as close to the true vertical as possible when the traction vehicle and car traverse a curve. In some instances, depending on variations in the vertical distance between the rail surface and the underside of the end of a car to be coupled, the axes of pins 178 and 183 may not be perfectly vertical after piston and cylinder assembly 170 has been actuated for transferring the desired portion of the weight of the railway car. However, in such a circumstance the axes of pins 178 and 183 do not vary from a true vertical to such an extent that operation of the coupling mechanism is impaired to any appreciable extent. This is true with respect to the other forms of coupling mechanism disclosed above.

While the invention has been shown in several forms, it will be obvious to those skilled in the art that it is not to be so limited, but on the contrary it is susceptible of various changes and modifications without departing from the spirit and scope of the appended claims.

I claim:
1. Coupling apparatus for coupling a traction vehicle to one end of a railway car in a manner whereby a portion of the weight of the car is transferred to the vehicle, said apparatus comprising, a first rigid member symmetrical about the longitudinal center line of the vehicle and being arranged for lifting engagement with one end of the car at least at locations spaced one on each side of the car center line, a second rigid member having a first end pivotally connected to said first member at the mid-point thereof for mounting the first member for pivoting movement about a vertical axis, said second rigid member having a second end, spaced longitudinally of the direction of vehicle movement from said first end, mounted to said vehicle by compensating means for permitting relative movement between said second rigid member and said vehicle in a generally horizontal plane, means carried by said second rigid member and including a draft connecting member engageable with the draft connecting member of the car at said one end thereof for clamping said first rigid member to the car thereby to prevent relative movement between the latter and the first rigid member and other means for lifting said second member, whereby said vehicle may support a portion of the weight of the car while traversing straight and curved track.

2. The apparatus according to claim 1 wherein said second end of the second rigid member is mounted to the vehicle for pivoting movement about a vertical axis.

3. The apparatus according to claim 1 wherein said second end of the second rigid member is mounted to the vehicle for sliding movement in a direction laterally of the direction of vehicle movement.

4. Coupling apparatus for coupling a traction vehicle to one end of a railway car in a manner whereby a portion of the weight of the car is transferred to the vehicle, wherein the car includes an end member supporting draft connecting means adjacent its mid-point, said apparatus comprising, a beam supporting a pair of seat members engageable with said end member at locations spaced one on each side of the car center line, which seat members each include a generally horizontal and a generally vertical surface arranged to engage the end member in a manner for transferring both a lifting and a pushing force through said end member to the car, said beam being mounted on the vehicle for upward movement, means for lifting the beam, and a draft link mounted on the vehicle and engageable with said draft connecting means for holding the end member in engagement with said seal members and for transferring a draft force to the car.

5. The coupling apparatus according to claim 4 wherein said seat members and said draft link constitute the sole force transmitting connections between the vehicle and the car.

6. Coupling apparatus for coupling a traction vehicle to one end of a railway car in a manner whereby a portion of the weight of the car is transferred to the vehicle, wherein the car includes an end member mounting a draft hook at its mid-point, said apparatus comprising, a beam supporting a pair of seat members engageable with said end member at locations spaced one on each side of the car center line, which seat members each include a generally horizontal and a generally vertical surface arranged to engage the end member in a manner for transferring both a lifting and a pushing force to the car, a rigid member having a first end pivotally connected to said beam at the mid-point thereof for mounting the beam for pivoting movement about a vertical axis, said rigid member having a second end, spaced longitudinally of the direction of vehicle movement from said first end, mounted to said vehicle by compensating means for permitting relative movement between said rigid member and said vehicle in a generally horizontal plane, means for lifting said beam, and a contractible draft link engageable with said draft hook for holding the end member in engagement with said seat members and for transferring a draft force to the car, whereby said vehicle may support a portion of the weight of the car while traversing straight and curved track.

7. The apparatus according to claim 6 wherein said seat members and said draft link constitute the sole force transmitting connections between the vehicle and car.

8. The apparatus according to claim 6 wherein said draft link includes means for maintaining at all times a tension force on said draft hook.

9. Coupling apparatus for coupling a traction vehicle to one end of a European-type railway car in a manner whereby a portion of the weight of the car is transferred to the vehicle, wherein the car includes an end sill mounting a draft hook at its mid-point, said apparatus comprising, a beam including a pair of seat members engageable with said end sill at locations spaced one on each side of the car center line, each of said seat members having a seat portion shaped for engagement with said end sill only at planar portions of the latter immediately adjacent the lower, outer, transversely extending edge of the end sill, a rigid member having a first end pivotally connected to said beam at the mid-point thereof for mounting the beam for pivoting movement about a vertical axis, said rigid member having a second end, spaced longitudinally of the direction of vehicle movement from said first end, mounted to said vehicle by compensating means for permitting relative movement between said rigid member and said vehicle in a generally horizontal plane, means for lifting said beam, and a draft link carried by said vehicle and engageable with said draft hook for holding the end sill in engagement with the seat members and for transferring a draft force to the car, whereby said vehicle may support a portion of the weight of the car while traversing straight and curved track.

10. The apparatus according to claim 9 whereby each of said seat members is adjustably mounted on said beam for independent movement laterally of the direction of vehicle movement.

11. Coupling apparatus for coupling a traction vehicle to one end of a European-type railway car in a manner whereby a portion of the weight of the car is transferred to the vehicle, wherein the car includes an end sill mounting a draft hook at its mid-point and a pair of buffers near its respective opposite ends, said coupling apparatus comprising, a first beam having separate, spaced-apart, depending means adapted for lifting engagement with respective buffers when the beam is disposed above the buffers, a first rigid member having a first end pivotally connected to said first beam at the mid-point thereof for mounting of the first beam for pivoting movement about a vertical axis, said first rigid member having a second end spaced longitudinally of the direction of vehicle movement from its first end, a second beam supporting a pair of seat members engageable with said end sill at locations spaced one on each side of the car center line, which seat members engage the end sill in a manner for transferring both a lifting and a pushing force to the car, a second rigid member having a first end pivotally connected to said second beam at the mid-point thereof for mounting the second beam for pivoting movement about a vertical axis, said second rigid member having a second end spaced longitudinally of the direction of vehicle movement from its first end, said first and second rigid members being mounted at their respective second ends to said vehicle by compensating means for permitting relative movement between said last-mentioned members and said vehicle in a generally horizontal plane, means for lifting said first and second beams independently, and a draft link carried by one of said rigid members and engageable with said draft hook for holding the end sill in engagement with said seat members and for transferring a draft force to the car, whereby said vehicle may support a portion of the weight of the car while traversing straight and curved track.

12. A coupling apparatus for coupling a traction vehicle to one end of a railway car in a manner whereby a portion of the weight of the car is transferred to the vehicle, said apparatus comprising, a first rigid member symmetrical about the longitudinal center line of the vehicle and having ends adapted for engagement with one end of the car at respective locations spaced one on each side of the car center line, each of said ends including a generally horizontal surface arranged for lifting engagement with an undersurface of the car underframe and a generally vertical surface facing the car for pushing engagement with a vertical surface of the car underframe, a second rigid member having a first end pivotally mounted to said first member at the mid-point thereof for mounting the first member for pivoting movement about a vertical axis, said second rigid member having a second end, spaced longitudinally of the direction of vehicle movement from said first end, mounted to said vehicle by compensating means for permitting, relative movement between said second rigid member and the vehicle in a generally horizontal plane, a draft connecting member carried by said vehicle and engageable with the draft connecting member of the car at said one end thereof for holding the car in engagement with said ends of the first rigid member and for transferring a draft force from the vehicle to the car, and means for lifting said first member.

13. The apparatus according to claim 12 wherein said second end of the second member is mounted to the vehicle for pivoting movement about a vertical axis.

14. The apparatus according to claim 12 wherein said second end of the second member is mounted to the vehicle for sliding movement in a direction laterally of the direction of vehicle movement.

15. Apparauts for coupling a traction vehicle to one end of a railway car in a manner whereby a portion of the weight of the car is transferred to the vehicle, said apparatus comprising first means adapted for clamping engagement with an end of said railway car for movement therewith, said first means including at least one member extending under the end of said car for lifting engagement therewith, rigid second means including an outer end pivotally secured to said first means for relative movement thereto in a generally horizontal plane, said second means including an inner end spaced longitudinally in the direction of vehicle movement from said outer end and mounted on said traction vehicle by compensating means for permitting relative movement between said second means and the traction vehicle in a generally horizontal plane, and means on the traction vehicle for forcing said one member upwardly, whereby said traction vehicle supports a portion of the weight of the railway car when traveling straight and curved track.

16. Apparatus for coupling a traction vehicle to one end of a railway car in a manner whereby a portion of the weight of the car is transferred to the vehicle, said apparatus comprising first means adapted for connection with the body of the car at one end thereof, said first means, when connected to the car, forming an extension of the same substantially rigid relative thereto, a rigid link member connected at its respective ends to said first means and the traction vehicle, connecting means adjacent each end of the rigid link for transmitting draft force from the vehicle to the car and permitting limited movement of the rigid link relative to both the vehicle and the car in a generally horizontal plane and means on the traction vehicle for forcing said first means upwardly, whereby said traction vehicle supports a portion of the weight of the railway car when traveling straight and curved track.

17. Apparatus for coupling a traction vehicle to one end of a railway car in a manner whereby a portion of the weight of the car is transferred to the vehicle, said apparatus comprising first means for locking draft and lifting engagement with the body of the car at one end thereof, said first means, when secured to the car, forming an extension of the same substantially rigid relative thereto, rigid second means connecting the first means to the vehicle and relatively movable with respect to both the vehicle and the car in a generally horizontal plane and means on the vehicle for forcing the point of connection between the first and second means upwardly whereby a portion of the weight of the car is transferred to the traction vehicle.

18. In a traction vehicle, apparatus for coupling engagement with one end of a railway car and for transferring a portion of the weight of the latter to the vehicle, which car includes a draft connecting member at said one end thereof, said apparatus including a generally horizontally disposed U-shaped member having the distal ends thereof adapted for lifting and pushing engagement with one end of said railway car at locations spaced one on each side of the longitudinal centerline thereof, a generally horizontally disposed arm extending generally longitudinally of the vehicle and having one end thereof connected to said U-shaped member at the bight portion thereof for supporting the latter for swinging movement relative to the arm about a generally vertical pivot axis, said arm having the other end connected to the vehicle by compensating means for permitting relative movement between said arm and said vehicle in a generally horizontal plane, a draft assembly carried by said arm, which assembly is adapted for draft engagement with the draft connecting member of said car, and means for forcing said U-shaped member upwardly for transferring a portion of the car weight to the vehicle.

19. The apparatus according to claim 18 wherein said compensating means includes means connecting said other end of the arm to the vehicle for swinging movement relative to the vehicle about a generally vertical axis.

20. The apparatus according to claim 18 wherein said draft assembly comprises a hydraulic piston and cylinder assembly including a draft link, a bracket carried by said arm for rotation about said pivot axis, which bracket includes means supporting said piston and cylinder assembly for pivoting movement about a horizontal axis.

21. In a traction vehicle, apparatus for coupling engagement with one end of a railway car and for transferring a portion of the weight of the latter to the vehicle, which car includes a draft connecting member at said one end thereof, said apparatus including a generally horizontally disposed U-shaped member having the distal ends thereof adapted for lifting and pushing engagement with one end of said car at locations spaced one on each side of the longitudinal centerline thereof, a rigid arm connected at its respective opposite ends to said vehicle and said U-shaped member at the bight portion thereof, connecting means adjacent each end of said arm permitting limited movement of the latter relative to both the vehicle and the U-shaped member in a generally horizontal plane, a draft assembly carried by said arm, which assembly is adapted for draft engagement with the draft connecting member of said car, and means for forcing said U-shaped member upwardly for transferring a portion of the car weight to the vehicle.

22. The apparatus according to claim 21 wherein each distal end of said U-shaped member includes integral, adjacent, horizontal and vertical surfaces for engagement with said one end of the car.

References Cited by the Examiner

Weight Transfer in a Two-Bogied Locomotive and its Compensation, by G. Borgeaud, paper No. 7, pp. 1–53, Convention on Adhesion, Nov. 27 and 28, 1963, London published by Institution of Mechanical Engineers, 1 Birdeage Walk, Westminster, London SW 1. (Copy in group 453).

ARTHUR L. LA POINT, *Primary Examiner.*